A. H. ARMSTRONG.
NUT LOCK.
APPLICATION FILED NOV. 23, 1907.

929,532.  Patented July 27, 1909.

Witnesses
R. D. Tolman.
Penelope Cumberbach.

Inventor
Arthur H. Armstrong.
By Henry Wood Fowler
Attorney.

UNITED STATES PATENT OFFICE.

ARTHUR H. ARMSTRONG, OF SANDWICH, MASSACHUSETTS, ASSIGNOR OF ONE-HALF TO A. CROSBY KENNETT, OF CONWAY, NEW HAMPSHIRE.

NUT-LOCK.

No. 929,532.          Specification of Letters Patent.          Patented July 27, 1909.

Application filed November 23, 1907. Serial No. 403,442.

*To all whom it may concern:*

Be it known that I, ARTHUR H. ARMSTRONG, of Sandwich, in the county of Barnstable and Commonwealth of Massachusetts, have invented a new and useful Improvement in Nut-Locks, of which the following is a specification accompanied by drawings, forming a part of the same, in which—

Figure 1:
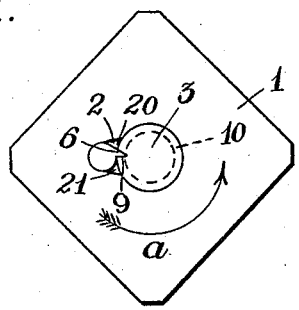
Figure 2:
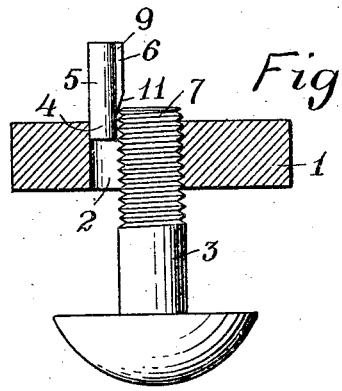
Figure 3:
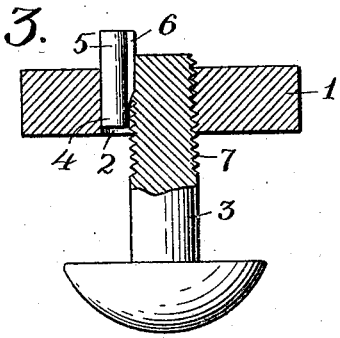
Figure 4:
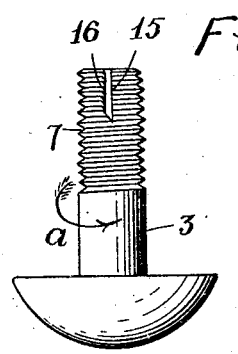
Figure 5:
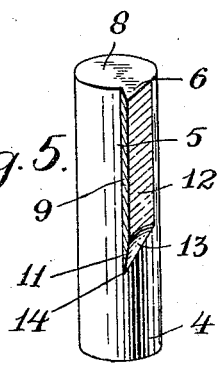

Figure 1 is a top view of a bolt and nut provided with a locking key embodying my invention. Fig. 2 is a side view with the nut shown in section, and with the key in position to be driven into the nut. Fig. 3 is a side view with a nut and a portion of the bolt in section, but with the key driven in position to lock the nut upon the bolt. Fig. 4 is a detached side view of the bolt. Fig. 5 is a perspective and detached view of the locking key.

Similar reference figures refer to similar parts in the different views.

My invention has for its object to provide means for locking a nut upon a bolt after it is screwed into the desired position and preventing its accidental removal, and I accomplish this result by using with the nut and bolt a locking key as hereafter described, the novel features of my improved device being pointed out in the annexed claims.

Referring to the accompanying drawings 1 denotes a screw threaded nut provided with a slot or keyway 2, parallel and communicating with a screw threaded hole in the nut to receive a bolt 3. When the nut has been screwed in position upon the bolt, as shown in Fig. 2, the smaller or cylindrical end 4 of a key 5 is inserted in the keyway, as shown in Fig. 2, and the key is then driven into the position shown in Fig. 3, forcing the rib 6 downward through the threads 7 of the bolt. As shown in Fig. 2 the key is firmly held in position parallel with the axis of the bolt by the insertion of its cylindrical end 4 between the side of the keyway and the threads of the bolt and in position to be driven into the nut without further support.

The key in its preferred form which is shown in perspective view and on a larger scale in Fig. 5, consists of a cylindrical body 8 having on one side a rib 6, preferably triangular in cross section and extending about two thirds the length of the key. The side 9 of the rib 6 lies in a plane which is radial to the cylindrical body of the key, and when the key is inserted in the keyway, the side 9 of the rib is placed in a plane radial to the bolt, so that the side 9 will coincide with a plane passing through the center of the key and the center of the bolt when the key is being driven. The rib 6 projects from the side of the key a distance approximately the depth of the screw thread in the nut, as shown in Fig. 1, the broken line 10 in said figure indicating the bottom of the screw thread upon the bolt.

The rib is beveled at its lower end at 11 and the oblique side 12 of the rib 6 is likewise beveled at 13, so that the apex of the rib will form a sharp cutting edge from the upper end of the key to the end 14 of the rib adapted to cut its way through the screw thread of the bolt as the key is driven into the position shown in Fig. 3. The radial side 9 of the key will pass through the screw threads of the bolt in the plane of the cutting edge of the rib, cutting off the screw threads squarely without deforming their severed ends as shown at 15, Fig. 4. The beveled surface 13, however, as it is driven over the severed ends of the screw threads 7 will deflect them toward the head of the bolt, as shown at 16, in Fig. 4, thereby deforming the severed ends of the screw threads at 16 sufficiently to hold the nut from accidental displacement in case the locking key should be removed, so that the locking of the nut in position does not depend upon the continued presence of the locking key.

When the locking key is removed the nut may be unscrewed from the bolt by turning it in the direction of the arrow *a*, Figs. 1 and 4, with sufficient force to straighten the deflected ends 16 of the screw threads of the bolt, the screw threads of the nut then acting as a die to restore the threads of the bolt. The object of deflecting the ends 16 of the screw threads of the bolt upon one side only of the cutting rib 6 is to enable the screw threads of the nut to more readily restore the threads of the bolt in unscrewing the nut, for in case the ends 15 were deformed, the threads of the nut would be forced directly against the bent ends instead of under them.

I prefer to form open spaces 20, 21 in the keyway on opposite sides of the rib 6 so that in case a sufficient force is applied the nut may be slightly rotated with the key in position, by causing the key to be turned on its axis to carry the rib 6 into one of the spaces 20, 21.

I am aware that it has been proposed to lock a nut upon its bolt by means of a key driven into a keyway provided with a cutting rib or edge, by which the opposing screw threads were severed, but this method does not provide sufficient security in case the key becomes accidentally displaced. I am also aware that it is not new to upset or flatten one or more screw threads upon the bolt by means of a punch, but this method requires that the punch be held while it is being driven, and it destroys the integrity of the thread so an attempt to remove the nut by force mutilates the threads upon both the bolt and nut. By my improvement I provide a locking key which can be held in the nut in position to be driven and sufficiently deflects the threads to hold the nut without destroying the integrity of the thread.

I claim,

1. A bolt and a nut having a longitudinal groove communicating with its screw threaded opening, a key arranged to be inserted in said groove and a rib on said key extending into said opening, with the entering end of said rib having a bevel extending entirely across said rib in a line diagonal to the axis of said key, and a cutting edge on the end of said rib at the apex of said diagonal bevel in a plane transverse to said key.

2. A bolt and a nut having a longitudinal groove communicating with its screw threaded opening, a key arranged to be inserted in said groove and a rib on said key parallel with the axis of said key, with one side of said rib in the plane of a radial line of said key, with the entering end of said rib beveled entirely across said rib diagonally to the axis of said key and with a cutting edge transverse to said key in the plane of said radial line at the apex of said bevel.

3. The combination with a bolt and a nut provided with a longitudinal cylindrical groove communicating with its screw threaded opening, of a cylindrical key of the same diameter as said groove, arranged to be inserted in said groove, and a triangular rib parallel with the axis of said key above said groove, with one side of said triangular rib on the radial line of said key, and extending to a distance approximately equal to the depth of the screw threads on said bolt, and with the lower end of said rib beveled.

4. A bolt and a nut having a longitudinal groove communicating with its screw threaded opening, a key arranged to be inserted in said groove and a rib on said key having one side in the plane of a radial line of said key, said rib beveled transversely from said radial line throughout its length, with the entering end of said rib transverse to said key beveled longitudinally in the plane of said radial line, said end having also a bevel diagonal to the axis of said key extending from said radial line entirely across said rib, with a cutting edge at the apex of said diagonal bevel on said radial line.

Dated this 18th day of November, 1907.

ARTHUR H. ARMSTRONG.

Witnesses:
HENRY WOOD FOWLER,
PENELOPE COMBERBACH.